(12) United States Patent
Stein et al.

(10) Patent No.: US 10,880,471 B2
(45) Date of Patent: *Dec. 29, 2020

(54) BUILDING NIGHT VISION AND OTHER DRIVER ASSISTANCE SYSTEMS (DAS) USING NEAR INFRA-RED (NIR) ILLUMINATION AND ROLLING SHUTTER

(71) Applicant: Mobileye Vision Technologies Ltd., Jerusalem (IL)

(72) Inventors: Gideon Stein, Jerusalem (IL); Efim Belman, Jerusalem (IL)

(73) Assignee: Mobileye Vision Technologies Ltd., Jerusalem (IL)

(*) Notice: Subject to any disclaimer, the term of this patent is extended or adjusted under 35 U.S.C. 154(b) by 44 days.

This patent is subject to a terminal disclaimer.

(21) Appl. No.: 16/350,373

(22) Filed: Nov. 12, 2018

(65) Prior Publication Data

US 2019/0109987 A1    Apr. 11, 2019

Related U.S. Application Data

(63) Continuation of application No. 15/787,480, filed on Oct. 18, 2017, now Pat. No. 10,129,465, which is a (Continued)

(51) Int. Cl.
*H04N 5/00* (2011.01)
*H04N 5/232* (2006.01)
(Continued)

(52) U.S. Cl.
CPC .......... *H04N 5/23229* (2013.01); *B60R 1/00* (2013.01); *H04N 5/2256* (2013.01); *H04N 5/235* (2013.01);
(Continued)

(58) Field of Classification Search
CPC .. H04N 5/23229; H04N 5/2256; H04N 5/235; H04N 5/2354; H04N 5/33; H04N 5/3532; B60R 1/00
See application file for complete search history.

(56) References Cited

U.S. PATENT DOCUMENTS

| 5,001,558 A | 3/1991 | Burley et al. |
| 6,704,621 B1 | 3/2004 | Stein et al. |

(Continued)

FOREIGN PATENT DOCUMENTS

| EP | 2448251 A3 | 10/2015 |
| JP | 2007174476 | 7/2007 |

(Continued)

OTHER PUBLICATIONS

"European Application Serial No. 19192365.5, Extended European Search Report dated Nov. 11, 2019", 9 pgs.

(Continued)

*Primary Examiner* — Frank F Huang
(74) *Attorney, Agent, or Firm* — Schwegman Lundberg & Woessner, P.A.

(57) ABSTRACT

A system mountable in a motor vehicle. The system includes a camera and a processor configured to receive image data from the camera. The camera includes a rolling shutter configured to capture the image data during a frame period and to scan and to read the image data into multiple image frames. A near infra-red illuminator may be configured to provide a near infra-red illumination cone in the field of view of the camera. The near infra-red illumination oscillates with an illumination period. A synchronization mechanism may be configured to synchronize the illumination period to the frame period of the rolling shutter. The frame period may be selected so that the synchronization mechanism provides a spatial profile of the near infra-red illumi- (Continued)

nation cone which may be substantially aligned vertically to a specific region, e.g. near the center of the image frame.

32 Claims, 5 Drawing Sheets

Related U.S. Application Data continuation of application No. 14/880,553, filed on Oct. 12, 2015, now Pat. No. 9,800,779, which is a continuation of application No. 13/283,701, filed on Oct. 28, 2011, now Pat. No. 9,179,072.

(60) Provisional application No. 61/421,424, filed on Dec. 9, 2010, provisional application No. 61/408,617, filed on Oct. 31, 2010.

(51) Int. Cl.
| | | |
|---|---|---|
| *H04N 5/235* | (2006.01) | |
| *H04N 5/353* | (2011.01) | |
| *H04N 5/33* | (2006.01) | |
| *B60R 1/00* | (2006.01) | |
| *H04N 5/225* | (2006.01) | |

(52) U.S. Cl.
CPC ............ *H04N 5/2354* (2013.01); *H04N 5/33* (2013.01); *H04N 5/3532* (2013.01)

(56) References Cited

U.S. PATENT DOCUMENTS

| | | |
|---|---|---|
| 7,113,867 B1 | 9/2006 | Stein |
| 7,733,464 B2 * | 6/2010 | David .................... G01S 17/18 356/5.03 |
| 7,881,496 B2 * | 2/2011 | Camilleri ................ B60R 1/00 340/904 |
| 8,064,643 B2 | 11/2011 | Stein et al. |
| 9,179,072 B2 | 11/2015 | Stein et al. |
| 9,800,779 B2 | 10/2017 | Stein et al. |
| 10,129,465 B2 | 11/2018 | Stein et al. |
| 2002/0041089 A1 * | 4/2002 | Yasui ................ B60R 21/01556 280/735 |
| 2004/0146203 A1 | 7/2004 | Yoshimura et al. |
| 2004/0165091 A1 | 8/2004 | Takemura et al. |
| 2005/0224713 A1 | 10/2005 | Koch et al. |
| 2006/0180670 A1 | 8/2006 | Acosta et al. |
| 2007/0211157 A1 | 9/2007 | Humpoletz et al. |
| 2007/0296849 A1 | 12/2007 | Sano et al. |
| 2009/0021612 A1 * | 1/2009 | Hamilton, Jr. ....... H04N 5/3532 348/249 |
| 2009/0153699 A1 | 6/2009 | Satoh et al. |
| 2009/0244288 A1 | 10/2009 | Fujimoto et al. |
| 2010/0069713 A1 | 3/2010 | Endo et al. |
| 2010/0149393 A1 | 6/2010 | Zarnowski et al. |
| 2010/0265316 A1 | 10/2010 | Sali et al. |
| 2012/0105639 A1 | 5/2012 | Stein et al. |
| 2013/0329006 A1 | 12/2013 | Boles et al. |
| 2016/0037064 A1 | 2/2016 | Stein et al. |
| 2018/0063423 A1 | 3/2018 | Stein et al. |

FOREIGN PATENT DOCUMENTS

| | | |
|---|---|---|
| JP | 2007318581 A | 12/2007 |
| WO | WO-2006060785 A2 | 6/2006 |

OTHER PUBLICATIONS

"U.S. Appl. No. 13/283,701, Final Office Action dated May 4, 2015", 21 pgs.
"U.S. Appl. No. 13/283,701, Final Office Action dated Jun. 23, 2014", 10 pgs.
"U.S. Appl. No. 13/283,701, Non Final Office Action dated Oct. 2, 2014", 12 pgs.
"U.S. Appl. No. 13/283,701, Non Final Office Action dated Dec. 31, 2013", 16 pgs.
"U.S. Appl. No. 13/283,701, Notice of Allowance dated Jul. 1, 2015", 5 pgs.
"U.S. Appl. No. 13/283,701, Response filed Jan. 14, 2015 to Non Final Office Action dated Oct. 2, 2014", 15 pgs.
"U.S. Appl. No. 13/283,701, Response filed Mar. 24, 2014 to Non Final Office Action dated Dec. 31, 2013", 8 pgs.
"U.S. Appl. No. 13/283,701, Response filed Jun. 22, 2015 to Final Office Action dated May 4, 2015", 9 pgs.
"U.S. Appl. No. 13/283,701, Response filed Sep. 22, 2014 to Final Office Action dated Jun. 23, 2014", 12 pgs.
"U.S. Appl. No. 14/880,553, 312 Amendment filed Jul. 5, 2017", 11 pgs.
"U.S. Appl. No. 14/880,553, Non Final Office Action dated Sep. 22, 2016", 20 pgs.
"U.S. Appl. No. 14/880,553, Notice of Allowance dated Apr. 12, 2017",10 pgs.
"U.S. Appl. No. 14/880,553, Notice of Allowance dated Jun. 23, 2017", 7 pgs.
"U.S. Appl. No. 14/880,553, Response filed Mar. 22, 2017 to Non Final Office Action dated Sep. 22, 2016", 14 pgs.
"U.S. Appl. No. 15/787,480, Notice of Allowance dated Jul. 5, 2018", 10 pgs.
"European Application Serial No. 11187158.8, Communication Pursuant to Article 94(3) EPC dated Feb. 15, 2018", 5 pgs.
"European Application Serial No. 11187158.8, Communication Pursuant to Article 94(3) EPC dated Apr. 20, 2017", 10 pgs.
"European Application Serial No. 11187158.8, Extended European Search Report dated Sep. 29, 2015", 9 pgs.
"European Application Serial No. 11187158.8, Response filed Mar. 16, 2016 to Communication Pursuant to Article 94(3) EPC dated Sep. 29, 2015", 19 pgs.
"European Application Serial No. 11187158.8, Response filed Aug. 24, 2018 to Communication Pursuant to Article 94(3) EPC dated Feb. 15, 2018", 13 pgs.
"European Application Serial No. 11187158.8, Response filed Aug. 30, 2017 to Communication Pursuant to Article 94(3) EPC dated Apr. 20, 2017", 18 pgs.
"European Application Serial No. 19192365.5, Response filed Jun. 30, 2020 to Extended European Search Report dated Nov. 11, 2019", 21 pgs.

\* cited by examiner

BUILDING NIGHT VISION AND OTHER DRIVER ASSISTANCE SYSTEMS (DAS) USING NEAR INFRA-RED (NIR) ILLUMINATION AND ROLLING SHUTTER

CROSS REFERENCE TO RELATED APPLICATIONS

This application is a continuation of U.S. application Ser. No. 13/283,701, filed Oct. 28, 2011, now U.S. Pat. No. 9,179,072, issued Nov. 2, 2015, which claims the priority benefit of U.S. Provisional Application No. 61/421,424, filed Dec. 9, 2010, and the priority benefit of U.S. Provisional Application No. 61/408,617, filed Oct. 31, 2010, each of which is hereby incorporated by reference in its entirety.

BACKGROUND

1. Technical Field

The present invention relates to driver assistance systems in motor vehicles, and in particular to providing a system and a method for night vision using a near infra-red (NIR) Illumination and a rolling shutter for driver assistance systems (DAS) applications.

2. Description of Related Art

During the last few years camera based driver assistance systems (DAS) have been entering the market; including lane departure warning (LDW), automatic high-beam control (AHC), traffic sign recognition (TSR) and forward collision warning (FCW).

Lane departure warning (LDW) systems may be designed to give a warning in the case of unintentional lane departure. The warning is given when the vehicle crosses or is about to cross the lane marker. Driver intention is determined based on use of turn signals, change in steering wheel angle, vehicle speed and brake activation. There may be various LDW systems available. One algorithm for lane departure warning (LDW) used by the Applicant/assignee (Mobileye Technologies Ltd., Nicosia, Cyprus, hereinafter "Mobileye") of the present application is predictive in that it computes time-to-lane crossing (TLC) based on change in wheel-to-lane distance and warns when the time-to-lane crossing (TLC) is below a certain threshold. Other algorithms give a warning if the wheel is inside a certain zone around the lane marker. In either case, essential to the lane departure warning system is the lane marker detection algorithm. Typically, the lane markers may be detected in the camera image and then, given the known camera geometry and camera location relative to the vehicle, the position of the vehicle relative to the lane is computed. The lane markers detected in the camera image may be then collected over time, for instance using a Kalman filter. Wheel-to-lane marker distance may be given with an accuracy of better than 5 centimeters. With a forward looking camera, wheel-to-lane marker distance is not observed directly but is extrapolated from the forward view of the camera. The closer road markings may be observed, less extrapolation is required for determining wheel-to-lane marker distance and more accurate estimates of wheel-to-lane marker distance may be achieved especially on curves of the road. Due to the car hood and the location of the camera, the road is seldom visible closer than six meters in front of the wheels of the car. In some cars with longer hoods, minimal distance to visible road in front of the car is even greater. Typically the lane departure warning system of Mobileye works on sharp curves (with radius down to 125 m). With a horizontal field of view (FOV) of 39 degrees of the camera, the inner lane markers may be still visible on curves with a radius down to 125 meters. In order to correctly perform lane assignment on curves, lane markings may be detected at 50 meters and beyond. With a horizontal field of view (FOV) of 39 degrees for the camera, a lane mark of width 0.1 meters at 50 m distance corresponds in the image plane to just under two pixels wide and can be detected accurately. The expectation from the lane departure warning systems is greater than 99% availability when lane markings may be visible. Expectation with 99% availability is particularly challenging to achieve in low light conditions when the lane markings may be not freshly painted (have low contrast with the road) and the only light source is the car halogen headlights. In low light conditions, the lane markings may be only visible using the higher sensitivity of the clear pixels (i.e. using a monochrome sensor or a red/clear sensor). With the more powerful xenon high intensity discharge (HID) headlights it is possible to use a standard red green blue (RGB) sensor in most low light conditions.

Traffic sign recognition (TSR) modules may be designed typically to detect speed limit signs and end-of-speed limit signs on highways, country roads and urban settings. Partially occluded, slightly twisted and rotated traffic signs may be preferably detected. Systems implementing traffic sign recognition (TSR) may or should ignore the following signs: signs on truck/buses, exit road numbers, minimum speed signs, and embedded signs. A traffic sign recognition (TSR) module which focuses on speed limit signs does not have a specific detection range requirement because speed limit signs only need to be detected before they leave the image. An example of a difficult traffic sign to detect is a 0.8 meter diameter traffic sign on the side of the road when the vehicle is driving in the center lane of a three lane highway. Further details of a TSR system is disclosed by the present assignee in patent application publication US20080137908.

A typical automatic headlight or high/low beam control (AHC) system detects the following conditions and switches from high beams to low beams: headlights of oncoming vehicles, taillights of preceding vehicles, street lights or ambient light indicating that high beams may be not required and a low vehicle speed. The host vehicle lights may be switched back to high beams when none of these conditions exist (often after a specified grace period). One approach for detecting taillights is to compare images from two sensors: one with a red filter and the second with a cyan filter. The cyan filter responds to non-red light sources and will give zero response to red light. By comparing corresponding pixels from two imaging sensors one can detect the color of the light source. The number of pixels of each color above a certain intensity is counted and if the count is above a threshold the systems switches to low beams. The use of color filters with imaging sensors may preclude the simultaneous use of the same image frames for other driver assistance applications.

A second approach for automatic high-beam control (AHC) uses an RGB sensor to give better color differentiation. Typical light sources can be located in the full CIE color space as defined by the International Commission on Illumination. This approach distinguishes between green, yellow and red lights. A powerful green traffic light is not confused with an oncoming vehicle. Since a single sensor with a color mosaic filter i.e. Bayer pattern mosaic is used, the lens is defocused so as to spread a light source over multiple pixels. The use of the color mosaic filter reduces both the effective image sensor resolution (by 50%) and the intensity response (to less than one third). The color mosaic filter may preclude the use of the same sensor for traffic sign recognition (TSR) or lane departure warning (LDW) because of the intensity response penalty.

Ego-motion estimation is disclosed in U.S. Pat. No. 6,704,621 by Stein. Image information is received from images recorded as the vehicle moves along a roadway. The image information is processed to generate an ego-motion estimate of the vehicle, including the translation of the vehicle in the forward direction and the rotation.

Some driver assistance systems may rely on changing camera exposure parameters (e.g. aperture, exposure, magnification). The use of a color camera equipped for instance with an RGB (red/green/blue) filter and an infra-red filter achieves good spectral separation for detecting taillights or brake lights but reduces imaging sensitivity by a factor of six or more. A reduction in sensitivity by such a factor has an adverse impact on other vehicle control application such as LDW performance in dark scenes. The presence of an infra-red filter also negates the use of the camera as a near infra-red sensor for applications, such as pedestrian detection. Thus, a brake light detection system which uses color or spectral analysis in the captured images may be less compatible with other driver assistance systems without sacrificing performance.

The core technology behind forward collision warning (FCW) systems and headway distance monitoring is vehicle detection. Assume that reliable detection of vehicles in a single image a typical forward collision warning (FCW) system requires that a vehicle image be 13 pixels wide, then for a car of width 1.6 m, a typical camera (640×480 resolution and 40 deg FOV) gives initial detection at 115 m and multi-frame approval at 100 m. A narrower horizontal field of view (FOV) for the camera gives a greater detection range however; the narrower horizontal field of view (FOV) will reduce the ability to detect passing and cutting-in vehicles. A horizontal field of view (FOV) of around 40 degrees was found by Mobileye to be almost optimal (in road tests conducted with a camera) given the image sensor resolution and dimensions. A key component of a typical forward collision warning (FCW) algorithm is the estimation of distance from a single camera and the estimation of scale change from the time-to-contact/collision (TTC) as disclosed for example in U.S. Pat. No. 7,113,867.

BRIEF SUMMARY

According to the present invention there is provided a system mountable in a motor vehicle. The system includes a camera and a processor configured to receive image data from the camera. The camera includes a rolling shutter configured to capture the image data during a frame period and to read the image data into multiple image frames, for instance alternately line by line. A near infra-red illuminator may be configured to provide a near infra-red illumination cone in the field of view of the camera. The near infra-red illumination oscillates with an illumination period. A synchronization mechanism may be configured to synchronize the illumination period to the frame period of the rolling shutter. The image frames include a long exposure frame and a short exposure frame. The synchronization mechanism is configured to turn on the near infra-red illumination during exposure of at least one of the middle rows of the long exposure frame. The frame period may be selected so that the synchronization mechanism provides a spatial profile of the near infra-red illumination cone which may be substantially aligned vertically to a specific region of the image frame.

The processor may include multiple driver assistance modules configured to perform respective multiple driver assistance functions. A first driver assistance module may be configured to use the near infra-red illumination and a second driver assistance module may be configured to use parts of an image that do not have the near infra-red illumination. The first driver assistance module may be configured to perform pedestrian detection responsive to the near infra-red illumination in the first multiple image frames. The second driver assistance module may use color information from the second image frames to detect headlights of an oncoming vehicle in the field of view of the camera, to detect taillights of a leading vehicle in the field of view of the camera, to detect taillights of a leading vehicle in the field of view of the camera and/or to detect a traffic sign in the field of view of the camera. The camera may be configured to provide to the processor the image frames. The image frames may be partitioned into first image frames for use by the first driver assistance module and into second image frames for use by a second driver assistance module. A parameter of the camera may be configurable to alternate respective values between the first and second image frames. The parameter may be the frame period of the rolling shutter.

The synchronization module may be configured to time the near infra-red illumination to be in the first image frames and to avoid the near infra-red illumination in the second image frames.

According to the present invention there is provided a method operable in a system mountable in a motor vehicle. The system include a processor, a camera having a rolling shutter configured to capture image data during a frame period and to scan line by line to read the image data of the image frame and to read the image data into a plurality of image frames. The method receives image data from the camera. Near infra-red (NIR) illumination may be provided in the field of view of the camera. The near infra-red illumination oscillates at an illumination frequency with an illumination period with an illumination duty cycle. The illumination period may be synchronized and to the rolling shutter. The image frames include a long exposure frame and a short exposure frame. The synchronization turns on the near infra-red illumination during exposure of at least one of the middle rows of said long exposure frame.

The camera may be configured to provide to the processor multiple image frames. The image frames may be partitioned into first image frames for use by a first driver assistance module and into second image frames for use by a second driver assistance module. The synchronization may provide the near infra-red illumination in the first image frames and avoids the near infra-red illumination in the second image frames. The values of a camera parameter may be alternated respectively in alternating first and second image frames. The camera parameter may be the frame period of the rolling shutter.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

The foregoing and/or other aspects will become apparent from the following detailed description when considered in conjunction with the accompanying drawing figures.

DETAILED DESCRIPTION

Reference will now be made in detail to aspects of the present invention, examples of which are illustrated in the accompanying drawings, wherein like reference numerals refer to the like elements throughout. The aspects are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, features of the present invention may be directed to a system that performs multiple Driver Assistance (DAS) applications concurrently on the same hardware platform wherein for instance at least one of the applications requires near infra-red (NW) illumination and at least one other application requires for instance color information. For example, one application might be pedestrian detection at night requiring near infra-red (NW) illumination and another application might be Automatic High-beam Control (AHC) which requires color information.

Rolling shutter is a method of image acquisition in which each frame is recorded not from a snapshot of a single point in time, but rather by scanning across the frame, for instance row by row. With a rolling shutter, not all parts of the image are recorded at exactly the same time, even though the whole frame is displayed at the same time during playback. The rolling shutter is in contrast with a global shutter where the entire frame is exposed for the same time window.

Since near infra-red (NIR) illumination is almost monochrome, all color information from reacted objects may be lost. With a global shutter image sensor, it may be possible to alternate between illuminated and non illuminated NIR frames. That is, the near infra-red (NIR) illumination is on for some image frames (those used for pedestrian detection for example) and off for image frames (those used for color based detection for example). A more complex situation is when a rolling shutter sensor is used. The rolling shutter may be more complex because rows in one image arc actually exposed at the same time as other rows for the following frame and there may be no period when it is possible to switch on the illuminator to uniformly expose all the rows of one image and none of the rows of the next image. According to different features of the present invention, when the rolling shutter sensor is used, an illumination frequency and duty cycle may be used which are carefully tuned to the camera exposure, combined with precise definition of the illumination cone.

Pedestrians may be detected up to a distance of 20 m using a standard automotive CMOS camera such as the Aptina MT9V024 (Aptina Imaging Corporation, San Jose, Calif., USA) under low beams. The detection distance increases significantly when using high beams but of course the use of high beams is limited when there is traffic so as not to blind other drivers. One possible way to increase detection distance is to use NIR illumination. NIR illuminators may be standard halogen highbeams with a long pass filter or dedicated IR illuminators such 850 nm light emitting diodes or LEDs. However with NW illumination all color information from reflective surfaces may be lost, particularly for the case of narrow band 850 nm LEDs but even if a wide NIR spectrum is used, the NIR response of typical red, green and blue pixels of a typical color sensor is the same for all three channels.

Figure 1A:
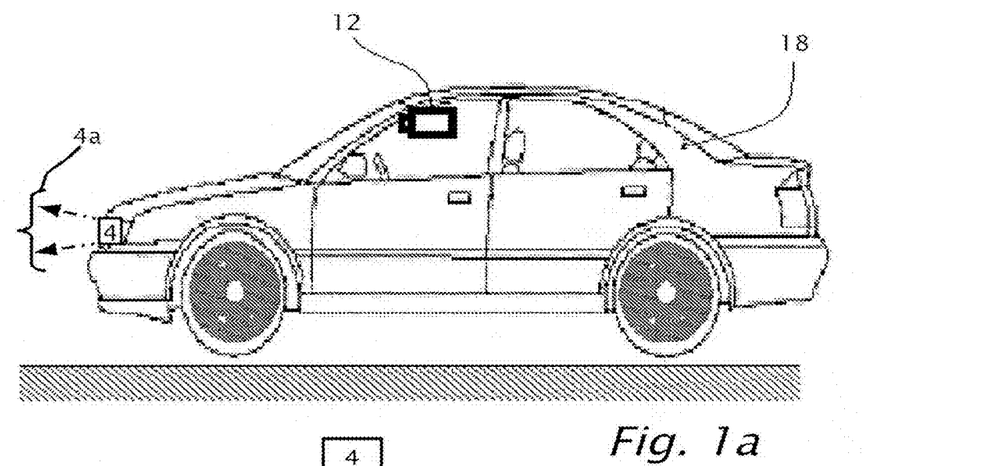
FIGS. 1a and 1b illustrate a system including a near infra-red (NIR) illuminator and a camera mounted in a vehicle, according to an aspect of the present invention.
Figure 1B:
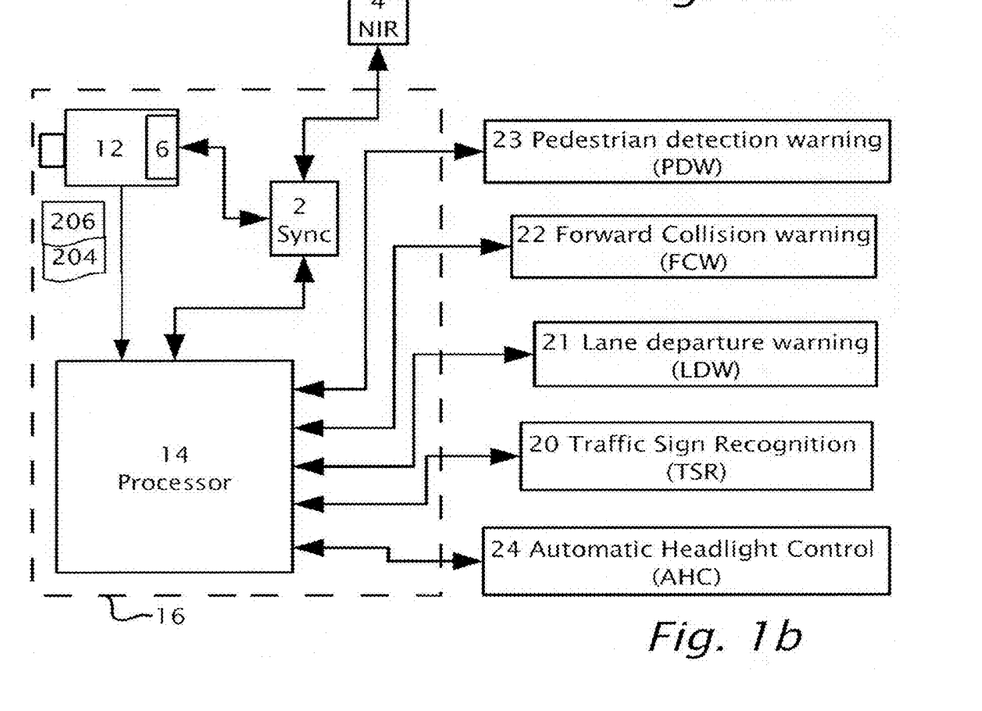

Reference is now made to FIGS. 1a and 1b which illustrate a system 16 including a near infra-red (NW) illuminator 4 and a camera 12 mounted in a vehicle 18, according to an aspect of the present invention. Illuminator 4 may be mounted in the headlights of vehicle 18 or in proximity of camera 12 to project NIR illumination 4a forward of vehicle 18. Camera 12 includes a sensor equipped with a rolling shutter 6. Camera 12 images a field of view in the forward direction which captures image frames 204/206 in real time and transfers image frames 204/206 to processor 14. Image processor 14 may be used to process image frames 204/206 simultaneously and/or in parallel and to provide multiple driver assistance functions. By way of example in FIG. 1b, image frames 204/206 may be used to serve forward collision warning (FCW) system 22, lane departure warning (LDW) 21, traffic sign recognition (TSR) 20, automatic headlight control 24 and pedestrian detection warning (PDW) 23. Synchronization mechanism 2 provides synchronization between the rolling shutter 6 of camera 12 and NIR illuminator 4.

Image processor 14 is used to process image frames 204/206 to detect a pedestrian in an image in the forward field of view of camera 12 as required for pedestrian detection warning (PDW) 23. Pedestrian detection warning (PDW) 23 works in parallel with the other driver assistance functions.

Table 1 shows typical high dynamic range (HDR) exposure and gain settings for the Aptina MT9M024 1.3 Megapixel camera 12, according to a feature of the present invention. Sensor 4 is set to produce images at 45 frames per second (FPS) or 22.2 ms per frame. Image frames 204/206 may be partitioned so that the exposures may alternate between a longer exposure setting used primarily for detecting road markings and pedestrian targets, and a shorter exposure which may give better color information and less motion blur to support AHC 24 and TSR 20 driver assistance systems.

TABLE 1

Aptina Grabbing Scheme

Sensor running on 45 FPS, 12 bit compacted image.
Algorithm running on two high dynamic range (HDR)
images up to 22.5 FPS.
Texture Exposure - gain up to 2.75 × 8, integration periods up
to {14, 0.875, 0.054} ms, knee factors 16, 16.
Color Exposure - gain 1, integration periods {11, 0.68, 0.042} ms,
knee factors 16, 16.
Frame capture at constant rate of 45 images per second.
Processing Produce 8 bit Tone Mapped image from each of Texture and Color
exposures for texture analysis.
Work directly on 12 bit images for color processing mainly on
Color exposure.
Night Vision Display the tone mapped image of Texture exposure should be used
pedestrian enhancement to be performed on tone mapped image.
running as separate process parallel and asynchronous to the
main processing.

Figure 7:
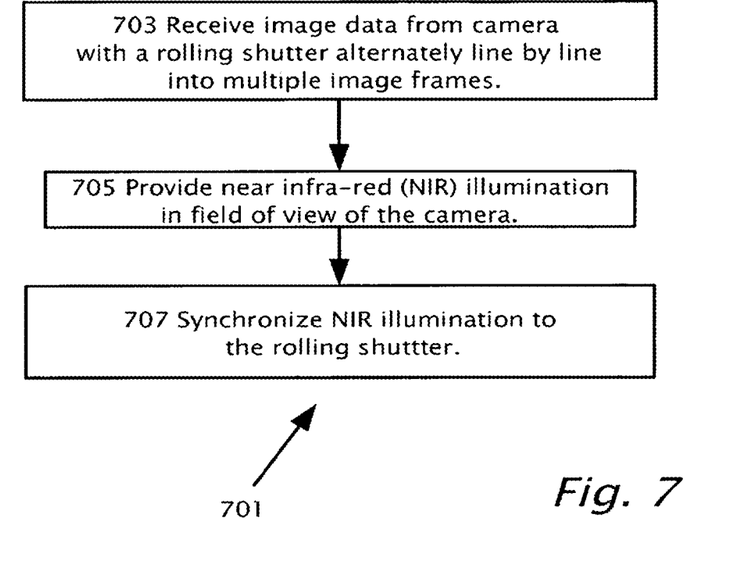
FIG. 7 shows a method, according to an aspect of the present invention.

Reference is now made to FIG. 7 which shows a method 701 according to an aspect of the present invention. Rolling shutter 6 scans line by line over an image frames 204/206 to read the image data alternately line by line into image frames 204 and 206. In step 703, the image data of multiple image frames 204/206 from camera 12 may be received by processor 14. In step 705, near infra-red (NIR) illumination may be provided from illuminator 4 to give NIR illumination 4a forward of vehicle 18. Illumination 4a oscillates with an oscillation frequency and an illumination duty cycle synchronized line by line with the exposure of frames 204/206 of rolling shutter 6.

The term "oscillation" as used herein in the context of near infra-red illumination refers to a repetitive variation of illumination intensity. The term "illumination frequency" as used herein is the frequency of the illumination intensity oscillation and the term "illumination period" is the inverse of the illumination frequency of the oscillation. The term "duty cycle" as used herein duty cycle refers to a substantially square wave infra-red oscillation between a state of higher illumination and a state of lower illumination. The term "duty cycle" is substantially equal to the time spent in the higher state divided by total time.

The term "exposure" as used herein refers to a time period during which a line of a frame of the rolling shutter is sensitive to light.

Synchronization mechanism 2 and synchronization step 707 may be performed if camera 12 has a general purpose input output (GPIO) pin which can be switched between 1 and 0 with a certain delay after the vertical synch of sensor 6. The signal from the general purpose input output (GPIO) pin may be then sent to the controller of NIR illuminator 4 to switch the near infra-red illumination on and off synchronously with rolling shutter 6. In some cases having the general purpose input output (GPIO) pin may not be available for synchronization 707. In such cases, NIR illumination controller may be set to a nominal frequency and duty cycle and rolling shutter 6 detects and locks into the exact frequency and phase. For example if the frequency is 22.5 Hz and the duty cycle is 50%, rolling shutter 6 frequency may be controlled very precisely (to an accuracy of 12 ns) by adjusting the horizontal and vertical blanking time of sensor 6.

Alternatively, synchronization (step 707) may be achieved for step 707 by maximizing the brightness of a central horizontal strip of an image frame 204/206.

Figure 2:
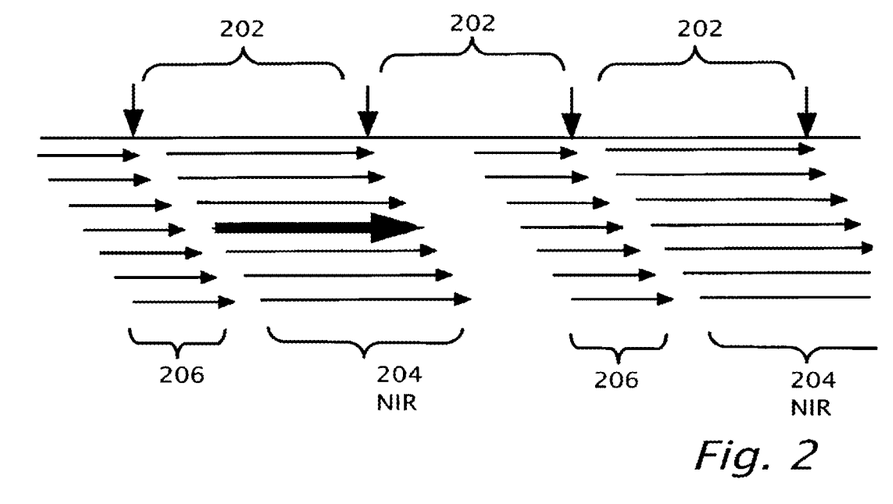
FIG. 2 shows a schematic description of exposure settings with a rolling shutter, according to a feature of the present invention.

Reference is now made to FIG. 2 which shows a schematic description of the exposure settings with rolling shutter 6, according to a feature of the present invention. Two types of image frames 206 and 204 may be shown. In the example, each image row starts and ends exposure approximately 22 μs after the previous row shown as interval 202. In the example, the long exposure in frame 204 is 15 milliseconds and the shorter exposure in frame 206 is 11 milliseconds. One important point may be that the exposure of the last rows in one image frame, e.g. 206 partially overlaps with the first rows of the next image frame, e.g. 204.

In both image frames 204 and 206 the frame interval 202 is 22.2 ms. Therefore the first row of the long exposure frame 204 starts 7.2 ms after the start of last row of the short exposure frame 206. The short exposure frame is 11 ms and the first row starts 11.2 ms after start of the last row of the long exposure frame.

Figure 3:
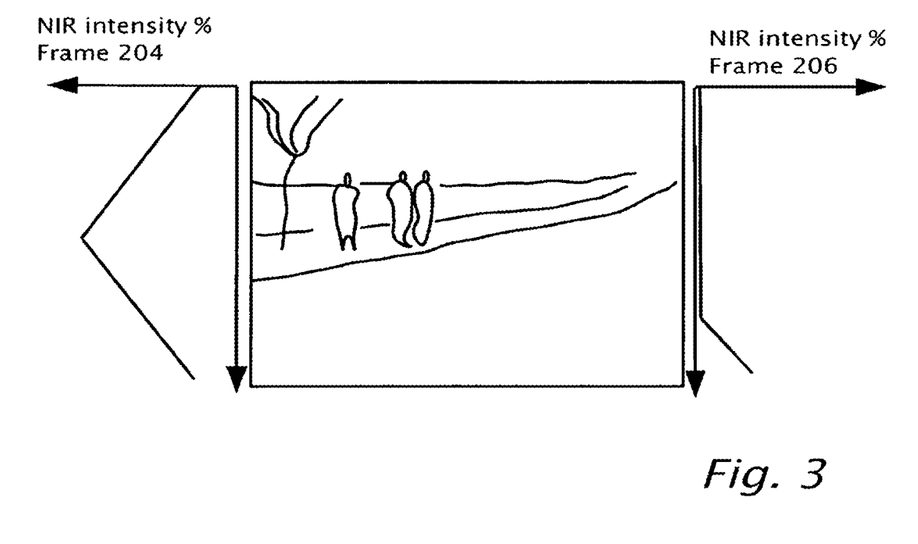
FIG. 3 shows schematically graphs of NIR intensity in percent for NIR an illuminator that is on for 15 ms and off for 30 ms, according to a feature of the present invention.

Reference is now also made to FIG. 3 which shows schematically graphs of NIR intensity in percent for NIR illuminator 4 that is on for 15 ms and off for 30 ms. The on time aligns with the middle row (shown as a horizontal arrow in FIG. 2) of the long exposure frame 204. This timing would give very little NIR illumination during the short frame 206 (only at the tail end) which may be desirable. However the NW illumination during long frame 204 will also be reduced. There will only be a number of rows or perhaps even just one row (shown as a horizontal arrow in FIG. 2) which has NIR illumination 4a for its full length. The issue becomes more complex when high dynamic range (HDR) sensor may be used.

FIG. 3 also shows pedestrians at 15 m. The pedestrians may be located in the central horizontal third of the image.

Figure 4A:
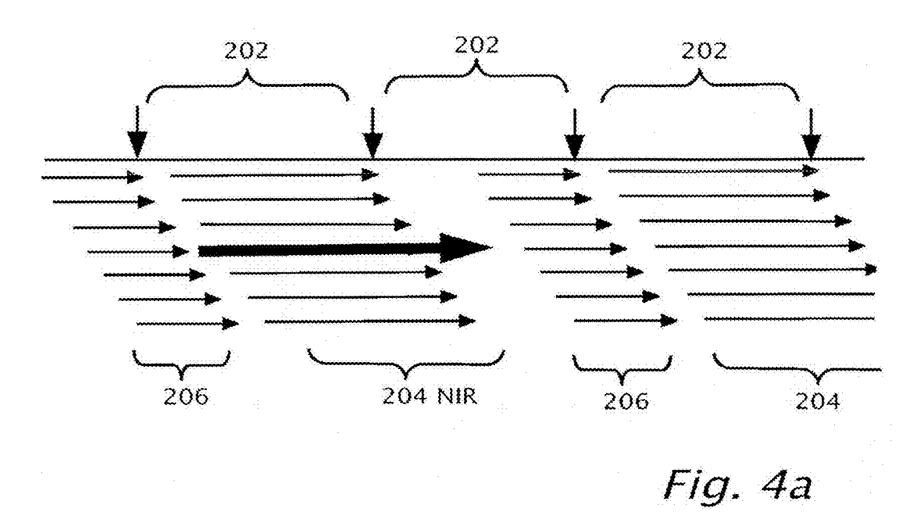
FIG. 4a shows a NW illuminator that is on for 22 ms and off for 30 ms, where the on time (indicated by horizontal arrow) aligns with the middle row of a long exposure frame, according to a feature of the present invention.

Reference is now made to FIG. 4a which shows a NIR illuminator 4 that is on for 22 ms and off for 30 ms, where the on time (indicated by horizontal arrow) aligns with the middle row of the long exposure frame. The center rows in the image have NIR illumination for their full length with the period of illumination dropping at the top and bottom. However there may be significant NIR illumination during the exposure time of the top and bottom row of short exposure frame 206.

Below is Table 2 which shows typical different DAS applications and the illumination requirements:

TABLE 2

Vehicle Detection: Vehicle detection at night at long distances by detecting headlights and
taillights NIR illumination may be detrimental to assessing taillight color. Close vehicle
detection may benefit from NIR illumination but NIR illumination may be not required.
Pedestrian (and animals) Detection 23: up to 20 m pedestrian can typically be detected
well with the host vehicles low beams. Beyond that range NIR illumination may be
recommended.
Traffic sign recognition 20: Regular reflective traffic signs may be typically located at the
side of the road and infrequently overhead. Electronic signs may be most often located
overhead. For correct color recognition and to avoid over-saturation it may be important TABLE 2-continued that the reflective signs may be not illuminated by the NIR 4 during the recognition stage.
Thus it may be important the central strip of the image not be illuminated by NIR during
the short exposure frame 206 and ideally neither the top. Dark, distant signs may benefit
from NIR illumination during the long exposure frame.
Automatic headlight control 24: Oncoming headlights and preceding taillights may be
detected without any host vehicle illumination. NIR illumination may be detrimental to
distinguishing, using color, between reflectors at the side of the road and distant taillights.
It may be important the central strip of the image not be illuminated by NIR during at least
one frame.
Lane departure warning 21: LDW can benefit from NIR illumination for distance road
markings. In order to determine lane mark color it would be best to not have NIR
illumination in the lower region of the image which may be well illuminated by the low
beams.

The above requirements in Table 2, lead to an illuminator 4 design which spreads the energy vertically over +/−5 deg and horizontally +/−20 degrees.

Figure 4B:
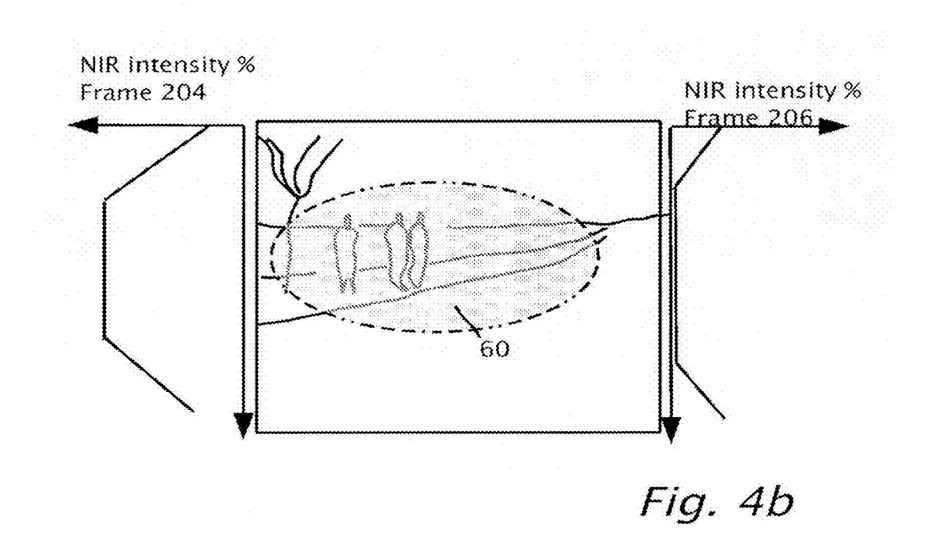
FIG. 4b shows an NIR spatial profile overlaid on an image with respective percentage (%) NIR intensities for two frames, according to a feature of the present invention.

FIG. 4b shows an NIR spatial profile 60 overlaid on an image with respective Percentage (%) NIR intensities for frames 204/206.

Figure 5:
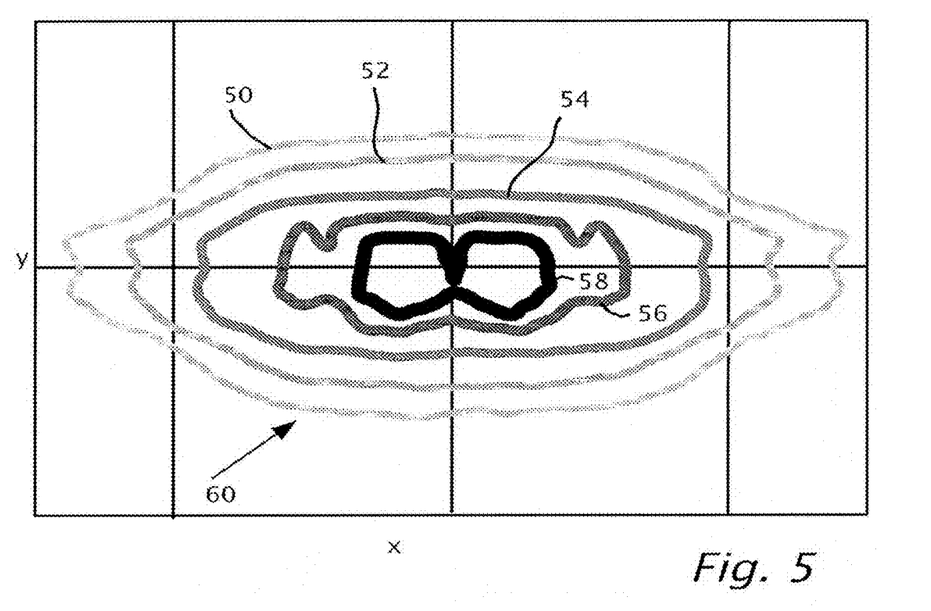
FIG. 5 shows schematically a typical spatial distribution in image space coordinates of an NW illumination cone, according to a feature of the present invention.

Reference is now made to FIG. 5 which shows schematically a typical spatial distribution 60 in image space coordinates of NW illumination cone, according to a feature of the present invention. The profile may be not optimal as its horizontal spread should be greater. It may be most interesting to look at how such an illumination profile matches the sensor timing.

Figure 6:
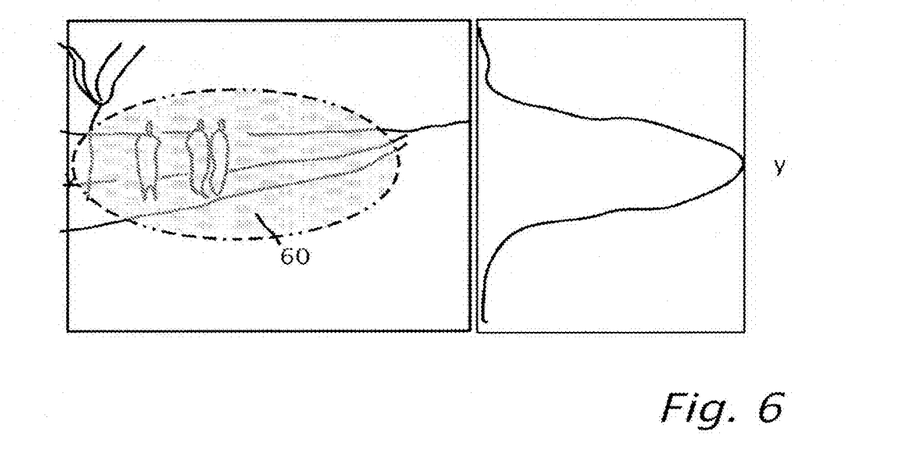
FIG. 6 shows the NIR spatial profile overlaid on an image, according to a feature of the present invention.

Reference is now made to FIG. 6 which shows the NIR spatial profile 60 overlaid on an image, according to a feature of the present invention. By carefully aligning the row timing and the NIR profile 60 maximum illumination on the important regions of the image frames during the long exposure frame 204 and virtually no illumination during the top and bottom rows of the short exposure image frame 206. Thus the short exposure image frame 206 may be almost clean of NIR artifacts. As an added bonus, the flickering of a reflector between short and long exposures 206 and 204 respectively, can further aid in distinguishing between reflectors at the side of the road and distant taillights.

Effects of High Dynamic Range (HDR) Imagers

Consider the high dynamic range (HDR) integration settings for the long exposure frame shown in Table 1. The first integration period of 14 ms is followed by integration period of 0.845 ms and then 0.054 ms. Typically a very bright patch in the image will saturate the long and medium integration periods and the pixel value will be determined by the short integration period. Less bright patches will perhaps saturate during the long integration period and the pixel value will be determined by the medium integration period. This high dynamic range (HDR) method is not designed for flickering light sources and has the following behavior: for patches that are saturated at the long integration period but then have no response during the medium and short integration periods, the pixel has a maximum value of about 256 (in 12 bit image with a maximum of 4095). For patches that are saturated at the medium integration period but then have no response during the short integration period, the pixel has a maximum value of about 1024. Referring again to FIGS. 4a and 4b, the bottom rows in the image the NIR illumination will not continue till the end of the frame. This means that for a few rows there will be only partial illumination during the short integration. Then for about 37 rows there will be no illumination during the short integration period and for only part of the medium integration period. Then for about 292 rows there will not be illumination during the short or medium integration periods. For these lines the maximum pixel value on reflectors will be limited to a maximum of 256.

Pedestrian Detection

Consider now a pedestrian illuminated by the NIR beams. Clothing, even black clothing, may be often very reflective to NW and can appear saturated in the image. However due to the effect described above, the bottom part of the pedestrian might not reach above a value of 256. Then there will be a band with a value of 1024 and only the top part will reach the true brightness levels above 1024. This makes pedestrian detection difficult as the pedestrian will look different depending on the exact vertical location in the image. It will also look bad in the display. These two issues may be addressed separately.

Pedestrian detection can be divided into four steps: (1) quickly finding initial candidates (2) more expensive pattern recognition often using an example based classifier (3) tracking over time and accumulating classification score (4) final approval or rejection.

Each may be affected differently by the NW and high dynamic range (HDR) timing:

1. Finding initial candidates: This first step often uses vertical and horizontal edges. The vertical edges, based on horizontal derivatives, are significantly not affected be the timing issue. The horizontal derivatives of the two lines, above and below the transition should be computed without vertical smoothing. The horizontal edges can be computed as usual but suppressing fake edges at the transition rows if the lower row value may be at the relevant saturation level (256 or 1024). The high dynamic range (HDR) effect can be used as a rejection cue since any pixel below the 1024 or 256 cutoff lines and with values above 1024 or 256 respectively must be a light source and not a reaction.

2. Classifier: The classifier cannot work directly on the images where the lower part is clipped at 256 and 1024 since the cutoff line will hit each pedestrian at a different vertical point on the body. One may simply clip the whole patch to be classified at 256 but then useful information might be lost. An alternative may be to leave the top half of the patch unchanged and the lower half (which includes both the 1024 and the 256 cutoff lines) is then clipped to 256. This gives uniform images but allows for full detail at least in the upper part of the body.

3. Tracking: Tracking may be performed on the patch and image after is is clipped to 256.

4. Final approval: This stage combines information from previous stages and does not address the image directly.

Night Vision Display

According to an aspect of the present invention the near infra-red illumination may be switched on and off in alternating frames 204/206. Multiple NIR illuminated frames 204 may be provided to processor 14 which may be used by pedestrian detection 23 for example. Multiple non-NIR illuminated frames 206 may be provided to processor 14 which may be used by AHC 24 and TSR 20 driver assistance systems for example. Partitioning of frames 204/206 into either NIR illuminated 204 or non NW illuminated frames 206 may also alternate between a longer or a shorter sensor 4 exposure time. The shorter sensor 4 time may be useful to give better color information and less motion blur when compared with the longer exposure time of sensor 6.

A consequence of switching the NW illumination on and off in alternate frames may be that for a night vision display, only half the frames may be usable and the effective frame rate may be halved. If 20 Hz is the minimum acceptable frame rate for night vision display then the acceptable frame rate must be 40 Hz or higher. If instead of switching off the NIR illuminator 4, the power is reduced to 50% every frame 206, the low reduced NW power frame 206 can still be used for night vision display. The power values cannot simply be multiplied by a factor of two since not all the image brightness may be due to the NIR illumination. Some of the image brightness may be from actual light sources and the lower part of image frames 204/206 may also be illuminated by low beams of host vehicle 18.

The first step may be to calibrate the low beams versus the NIR illuminator 4 to determine a smooth image function that describes by what value may be needed to multiply that particular pixel when the NIR illumination may be halved. This calibration may be done automatically when vehicle 18 may be stationary. During driving the 50% frame 206 may be multiplied by a factor $\alpha$. Pixels which are bright and suspected of being a light source may be tracked between consecutive frames 204/206 by first assuming a scaling of a and secondly using a scaling of 1 for a light source. The match that gives the best tracking score.

The above discussion assumed that the exposures are linear and remain constant between consecutive frames. If a high dynamic range (HDR) sensor may be used then the image values can be mapped to a linear image before scaling. If alternating exposure values are used then scaling values may be adapted accordingly.

The near infra-red (NIR) and high dynamic range (HDR) timing produce two horizontal cutoff lines in the image. In order to produce a smooth transition, pedestrians and other regions may be treated separately. For pedestrians, if the upper part of the pedestrian, just above the cutoff line is above the 1024 cutoff value, first compute an average value for all pixels of 1024 and up. Then all pixels are colored of the detected pedestrian that are below the cutoff line, that are of the cutoff values of 256 or 1024 according to this average pixel value. A similar technique may be used to blend the pixels below the lower cutoff line if need be.

For non pedestrian regions a similar idea may be used, however:

(1) We only extend it to 100 rows below the upper cutoff line with a linear transition between the average value and the cutoff value of 256.

(2) We only affect pixels that are connected to pixels above the cutoff line which are above the cutoff value. This may be done using a recursive pixel fill (or paint) operation.

Switching the Near Infra-Red (NIR) Source on Each Odd Row

If LED illuminators 4 are used then can be switched on and off at very high frequencies. Consider what would happen if during the 22 ms when the near infra-red (NIR) is typically on, the near infra-red (NIR) source was switched off during the short integration period of the odd rows. If the short integration period matched the shift between start times of consecutive rows then reflectors would not reach values above 1024 on odd rows. Thus it would be simple to tell if a bright patch was a light source or a reflector: it would have even rows reaching levels above 1024 and odd rows clipped at 1024.

Close and mid-range pedestrians will often reach values above 1024. For near infra-red (NW) display, if there is a pixel on an odd row with a value of 1024 and higher values above and below, the 1024 may be replaced with the average value. It may be possible to do the same for pedestrian detection: the edge detection for initial candidates will still work well and so will a classifier if the classifier is trained to examples that were processed in a similar manner.

The indefinite articles "a", "an" is used herein, such as "an illuminator", "a driver assist system" have the meaning of "one or more" that is "one or more illuminators" or "one or more driver assist systems".

Examples of various features/aspects/components/operations have been provided to facilitate understanding of the disclosed features of the present invention. In addition, various preferences have been discussed to facilitate understanding of the disclosed features of the present invention. It is to be understood that all examples and preferences disclosed herein arc intended to be non-limiting.

Although selected features of the present invention have been shown and described individually, it is to be understood that at least aspects of the described features may be combined. Also although selected features of the present invention have been shown and described, it is to be understood the present invention is not limited to the described features. Instead, it is to be appreciated that changes may be made to these features without departing from the principles of the invention, the scope of which is defined by the claims and the equivalents thereof.

What is claimed:

1. A system comprising:
   a processor configured to:
   receive image data from a camera, the camera configured to scan the image data line-by-line into a plurality of image frames;
   generate a plurality of infra-red image frames, the plurality of infra-red image frames including infra-red image data scanned while an illuminator provides a first intensity of infra-red illumination in a field of view of the camera; and
   generate a plurality of color image frames, the plurality of color image frames including color image data scanned while the illuminator provides the second intensity of infra-red illumination, the first intensity of infra-red illumination greater than the second intensity of infra-red illumination;
   wherein:
   the first and second infra-red illuminations oscillate with an oscillation frequency and an illumination duty cycle; and
   the infra-red illuminator provides the first and second infra-red illuminations based on a synchronization signal provided by a synchronization mechanism configured to synchronize the oscillation frequency and the illumination duty cycle line-by-line with an exposure of the image frames and vary the intensity of the first and second infra-red illuminations between at least two lines during line-by-line scanning of image data by the camera.

2. The system according to claim 1, wherein:
   the infra-red illuminator provides near infra-red illumination; and the plurality of infra-red image frames includes near infra-red image data.

3. The system according to claim 1, wherein:
the plurality of image frames include a long exposure frame and a short exposure frame; and
the synchronization mechanism is configured to initiate the activation of the infra-red illumination during exposure of at least one row from a central region but not all rows of the long exposure frame.

4. The system according to claim 1, wherein:
the camera includes a rolling shutter configured to capture the image data during a frame period; and
the frame period of the camera is selected so that the synchronization mechanism provides a spatial profile of an infra-red illumination cone substantially aligned vertically to a specific region of at least a portion of the image frames.

5. The system according to claim 1, wherein:
the processor includes a plurality of applications;
a first application of the plurality of applications is configured to use the plurality of infra-red image frames; and
a second application of the plurality of applications, different from the first application, is configured to use the plurality of color image frames.

6. The system according to claim 5, wherein the plurality of image frames is partitioned into first image frames for use by the first application and into second image frames for use by the second application.

7. The system according to claim 6, wherein the synchronization module is configured to:
time the first intensity of infra-red illumination to be in at least a portion in each of the plurality of infra-red image frames; and
time the second intensity of infra-red illumination to be in at least a portion in each of the color image frames.

8. The system according to claim 6, wherein a parameter of the camera is configurable to alternate respective values between the first and second image frames.

9. The system according to claim 8, wherein the parameter is a frame exposure time of the camera.

10. The system according to claim 6, wherein the first application is configured to perform detection of a person responsive to the infra-red illumination in the first image frames.

11. The system according to claim 6, wherein the second application uses color information from the second image frames to detect one or more types of light sources in the field of view of the camera.

12. The system according to claim 6, wherein the second application uses color information from the second image frames to detect a sign in the field of view of the camera.

13. The system according to claim 1, wherein:
the synchronization mechanism is configured to turn off the infra-red illumination during exposure of at least one middle row of an image frame; and
an application of the processor uses color information from the image frame.

14. The system according to claim 1, wherein:
the synchronization mechanism is configured to turn off the infra-red illumination during exposure of at least one middle row of an image frame; and
an application of the processor uses the image frame to recognize reflective signs.

15. The system according to claim 1, wherein the synchronization mechanism is configured to turn on the infra-red illumination for less than an image frame capture duration of the plurality of image frames.

16. The system according to claim 1, wherein:
the second intensity is provided while the first line of the first image frame of the plurality of image frames is scanned; and
the first intensity is substantially zero.

17. A method comprising:
receiving image data at a processor from a camera, the camera configured to scan the image data line-by-line into a plurality of image frames;
generating a plurality of infra-red image frames at the processor, the plurality of infra-red image frames including infra-red image data scanned while an illuminator provides a first intensity of infra-red illumination in a field of view of the camera; and
generate a plurality of color image frames at the processor, the plurality of color image frames including non infra-red image data scanned while the illuminator provides the second intensity of infra-red illumination, the first intensity of infra-red illumination greater than the second intensity of infra-red illumination;
wherein:
the first and second infra-red illuminations oscillate with an oscillation frequency and an illumination duty cycle; and
the infra-red illuminator provides the first and second infra-red illuminations based on a synchronization signal provided by a synchronization mechanism configured to synchronize the oscillation frequency and the illumination duty cycle line-by-line with an exposure of the image frames and vary the intensity of the first and second infra-red illuminations between at least two lines during line-by-line scanning of image data by the camera.

18. The method according to claim 17, wherein:
the infra-red illuminator provides near infra-red illumination; and
the plurality of infra-red image frames includes near infra-red image data.

19. The method according to claim 17, wherein:
the plurality of image frames includes a long exposure frame and a short exposure frame; and
the synchronization initiates the activation of the infra-red illumination during exposure of at least one row from a central region but not all rows of the long exposure frame.

20. The method according to claim 17, wherein
the camera includes a rolling shutter configured to capture the image data during a frame period; and
the frame period of the camera is selected so that the synchronization provides a spatial profile of an infra-red illumination cone substantially aligned vertically to a specific region of at least a portion of the image frames.

21. The method according to claim 17, wherein:
the processor includes a plurality of applications;
a first application of the plurality of applications is configured to use the plurality of infra-red image frames; and
a second application of the plurality of applications, different from the first application, is configured to use the plurality of color image frames.

22. The method according to claim 21, further comprising configuring the camera to provide to the processor the plurality of image frames, wherein the plurality of image frames is partitioned into first image frames for use by the first application and into second image frames for use by the second application.

23. The method according to claim 22, wherein the synchronization provides the first intensity of infra-red illumination in at least a portion in each of the infra-red image frames and provides the second intensity of infra-red illumination in at least a portion in each of the color image frames.

24. The method according to claim 22, further comprising alternating respective values of a camera parameter in alternating first and second image frames.

25. The method according to claim 24, wherein the camera parameter is a frame exposure time of the camera.

26. The method according to claim 22, wherein the first application is configured to perform detection of a person responsive to the infra-red illumination in the first image frames.

27. The method according to claim 22, wherein the second application uses color information from the second image frames to detect one or more types of light sources in the field of view of the camera.

28. The method according to claim 22, wherein the second application uses color information from the second image frames to detect a sign in the field of view of the camera.

29. The method according to claim 17, wherein:
the second intensity is provided while the first line of the first image frame of the plurality of image frames is scanned; and
the first intensity is substantially zero.

30. The method according to claim 17, wherein:
the synchronization turns off the infra-red illumination during exposure of at least one middle row of an image frame; and
an application of the processor uses color information from the image frame.

31. The method according to claim 17, wherein:
the synchronization turns off the infra-red illumination during exposure of at least one middle row of an image frame; and
an application of the processor uses the image frame to recognize reflective signs.

32. The method according to claim 17, wherein the synchronization turns on the infra-red illumination for less than an image frame capture duration of the plurality of image frames.

* * * * *